US012594910B2

(12) United States Patent
Kim et al.

(10) Patent No.: US 12,594,910 B2
(45) Date of Patent: Apr. 7, 2026

(54) APPARATUS FOR CLEANING A SENSOR

(71) Applicants: HYUNDAI MOTOR COMPANY, Seoul (KR); KIA CORPORATION, Seoul (KR)

(72) Inventors: Kyung Hwan Kim, Seoul (KR); Sang Heon Wang, Bucheon-si (KR); Dong Eun Cha, Hwaseong-si (KR); Nak Kyoung Kong, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 271 days.

(21) Appl. No.: 18/113,171

(22) Filed: Feb. 23, 2023

(65) Prior Publication Data

US 2024/0109518 A1 Apr. 4, 2024

(30) Foreign Application Priority Data

Oct. 4, 2022 (KR) ......................... 10-2022-0126014

(51) Int. Cl.
B60S 1/56 (2006.01)
B60S 1/52 (2006.01)

(52) U.S. Cl.
CPC .. B60S 1/56 (2013.01); B60S 1/52 (2013.01)

(58) Field of Classification Search
None
See application file for complete search history.

(56) References Cited

U.S. PATENT DOCUMENTS

| | | | | |
|---|---|---|---|---|
| 2001/0027817 | A1* | 10/2001 | Giacomini | F16L 41/03 |
| | | | | 137/884 |
| 2018/0023743 | A1* | 1/2018 | Sasaki | F24D 3/1075 |
| | | | | 137/884 |
| 2020/0038287 | A1* | 2/2020 | Backer | F16L 33/035 |
| 2021/0061237 | A1* | 3/2021 | Krishnan | G01S 7/4813 |
| 2021/0146406 | A1* | 5/2021 | Sykula | G01S 7/4813 |
| 2022/0041139 | A1* | 2/2022 | Surineedi | B60S 1/56 |
| 2022/0057509 | A1* | 2/2022 | Sykula | G01S 7/4043 |
| 2022/0066032 | A1* | 3/2022 | Glickman | G02B 27/0006 |
| 2022/0097656 | A1* | 3/2022 | Sykula | G01S 13/931 |
| 2022/0169210 | A1* | 6/2022 | Rachow | B60S 1/52 |
| 2022/0203940 | A1* | 6/2022 | Schroeder | B08B 9/093 |
| 2022/0388483 | A1* | 12/2022 | Curtwright | B60S 1/3404 |

FOREIGN PATENT DOCUMENTS

| | | | | | |
|---|---|---|---|---|---|
| FR | | 3089262 A1 * | 6/2020 | | F04D 13/14 |
| FR | | 3089273 A1 * | 6/2020 | | B60S 1/481 |

* cited by examiner

*Primary Examiner* — Omair Chaudhri
(74) *Attorney, Agent, or Firm* — Lempia Summerfield Katz LLC

(57) ABSTRACT

An apparatus for cleaning a sensor includes: at least one fluid flow path unit assembled and arranged to correspond to a size and a field of view (FOV) region of a sensor unit and formed with a spray flow path for flowing a fluid supplied through an inlet nozzle, a cover unit coupled to each of the fluid flow path units to shield an opened upper surface of the fluid flow path unit, and a spray nozzle unit selectively coupled to the cover unit and formed so that the fluid flowing along the spray flow path is sprayed toward the FOV region.

13 Claims, 7 Drawing Sheets

APPARATUS FOR CLEANING A SENSOR

CROSS-REFERENCE TO RELATED APPLICATION

This application claims under 35 U.S.C. § 119(a) the benefit of and priority to Korean Patent Application No. 10-2022-0126014 filed on Oct. 4, 2022, the entire contents of which are incorporated herein by reference.

BACKGROUND

(a) Field

The present disclosure relates to an apparatus for cleaning a sensor, and more specifically, to an apparatus for cleaning a sensor which may make the cleaning of various LiDAR sensors universal regardless of a size or field of view (FOV) region of the LiDAR sensor.

(b) Background Art

In general, an autonomous traveling level 3 function requires functions such as autonomous parking as well as autonomous highway traveling. Due to this, there is an increasing need for a LIDAR sensor with high distance resolution.

Such the LiDAR sensor functions to detect an object or a structure by sensing the front and rear of a vehicle.

Usually, the LiDAR sensor is mounted on a front bumper and exposed to the outside. The reason for this is to prevent the degradation of detection performance of the LiDAR that may happen if the LiDAR sensor is exposed to the outside, for example, the installation of the LiDAR sensor on glass or other structures such as a vehicle body. This may significantly decrease the detection performance of the LiDAR sensor.

The LiDAR sensor includes a laser transmitter, a laser receiver, a driver, and the like as well as a cover configured to protect the sensor from external contaminants.

In other words, since the LiDAR sensor is a sensor configured to detect a distance through a method of transmitting and receiving light, the existence of a cover is essential, and since the sensor can be very sensitive to contamination of the cover, the prevention of the contamination of the LiDAR sensor is also essential for maintaining the performance of the LiDAR sensor.

To this end, an apparatus for cleaning a sensor may be applied to perform a function of transmitting a washer fluid in a reservoir to a washing nozzle through a hose using pressure of a washer pump and removing foreign substances present in a field of view region of the LiDAR sensor and cleaning the LiDAR sensor by spraying the washer fluid through the nozzle as the washer pump of the reservoir operates.

However, the size and FOV region of the LiDAR sensor are different depending on component suppliers, the performance of the LiDAR, and the like.

The above information disclosed in this Background section is provided only to enhance understanding of the background of the disclosure and accordingly it may include information that does not form the prior art that is already known to a person of ordinary skill in the art.

SUMMARY OF THE DISCLOSURE

The present disclosure provides an apparatus for cleaning a sensor, which may make the cleaning of a LiDAR sensor universal by applying different washer fluid spray structures according to a size and a field of view (FOV) region of 180° or 360° of the LiDAR sensor by modularizing a plurality of washer fluid flow paths including a nozzle and selectively assembling or disassembling one or more modularized washer fluid flow paths to correspond the size or FOV region of the LiDAR sensor and change a length and shape of the washer fluid flow path.

In accordance with one aspect of the present disclosure, an apparatus for cleaning a sensor includes: at least one fluid flow path unit assembled and arranged to correspond to a size and a field of view (FOV) region of a sensor unit and formed with a spray flow path for flowing a fluid supplied through an inlet nozzle, a cover unit coupled to each of the fluid flow path units to shield an opened upper surface of the fluid flow path unit, and a spray nozzle unit selectively coupled to the cover unit and formed so that the fluid flowing along the spray flow path is sprayed toward the FOV region.

Here, the fluid flow path unit may include a first housing including the inlet nozzle, formed in an opened top box shape, and each provided with a connecting member and an assembling hole in a vertical direction and at least one second housing formed in the same shape as that of the first housing and arranged to be close to the first housing to form the spray flow path.

One or more fluid flow path units may be disposed so that the first housing corresponds to the FOV region and are connected to a reservoir in which the fluid is stored by the inlet nozzle, and the fluid flow path unit may be formed to correspond to a 360° FOV region of the sensor unit by arranging at least one second housing to be close to the first housing.

In addition, the fluid flow path unit may be formed to correspond to a 180° FOV region of the sensor unit by selectively disassembling the first housings disposed separately and the second housing arranged between the first housings and arranging at least one second housing between two first housings.

In addition, the second housing may have the same connecting member and assembling hole as those of the first housing provided on one side and the other side thereof, respectively, in a direction of being arranged between the first housings and may be assembled to correspond to the size and FOV region of the sensor unit at a length by fastening the connecting member and the assembling hole facing each other.

In addition, the fluid flow path unit may include an O-ring member mounted on the connecting member provided on each of the first housing and the second housing to seal the spray flow path when the first housing and the second housing are assembled and the at least one second housing is assembled.

In addition, the fluid flow path unit may include an auxiliary fastening member formed to protrude in the same direction as that of the connecting member provided on each of the first housing and the second housing and configured to assist the assembling by being positioned to be latched when the first housing and the second housing are assembled and the at least one second housing is assembled.

In addition, the fluid flow path unit may include a finishing member mounted on each of the connecting member and the assembling hole provided in the first housing and formed to shield the inside of the first housing exposed to the outside.

Meanwhile, the cover unit may include a first cover member formed to shield an opened upper surface of the first housing, a second cover member formed to shield an opened upper surface of the second housing, and a third cover member formed to shield the opened upper surface of the second housing and including a mounting hole for mounting the spray nozzle unit.

Here, the third cover member may be mounted alternately with the second cover member or consecutively mounted selectively on the upper surface of the second housing.

In addition, the cover unit may include an auxiliary fastening member formed to protrude in the same direction as that of the connecting member provided on each of the first housing and the second housing and configured to assist the assembling by being positioned to be latched when the first housing and the second housing are assembled and the at least one second housing is assembled.

Meanwhile, a plurality of spray nozzle units with different spray angles may be provided.

The plurality of spray nozzle unit with different spray angles may be alternately coupled when coupled to the cover unit.

In accordance with another aspect of the present disclosure, an apparatus for cleaning a sensor includes at least one fluid flow path unit assembled and arranged to correspond to a size and a field of view (FOV) region of a sensor unit, formed with a spray flow path for flowing a fluid supplied through an inlet nozzle, and including a cover unit coupled integrally to shield an opened upper surface and a spray nozzle unit coupled to the cover unit and formed so that the fluid flowing along the spray flow path is sprayed toward the FOV region of the sensor unit.

Meanwhile, a plurality of spray nozzle units with different spray angles may be provided.

The plurality of spray nozzle unit with different spray angles may be alternately coupled when coupled to the cover unit.

According to the present disclosure, it is possible to make the cleaning of the LiDAR sensor universal by applying different washer fluid spray structures according to the size and the field of view (FOV) region of 180° or 360° of the LiDAR sensor by modularizing a plurality of washer fluid flow paths including a nozzle and selectively assembling or disassembling one or more modularized washer fluid flow paths to correspond the size or FOV region of the LiDAR sensor and change a length and shape of the washer fluid flow path.

In addition, it is possible to selectively adjust the spray range of the washer fluid by including the plurality of covers configured to shield the upper surface of the washer fluid flow path and alternately coupling or consecutively mounting the covers provided with the mounting holes for mounting the spray nozzle among the plurality of covers.

According to the present disclosure, it is possible to extensively adjust the spray range of the washer fluid with a relatively high viscosity to make it easy to clean the LiDAR sensor by consecutively mounting the covers provided with the mounting hole on the washer fluid flow path for the vehicle traveling the cold region.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed below.

BRIEF DESCRIPTION OF THE DRAWINGS

The above and other features of the present disclosure are now described in detail with reference to certain embodiments thereof illustrated in the accompanying drawings which are given herein below by way of illustration only, and thus are not limitative of the present disclosure, and wherein.

Figure 1:
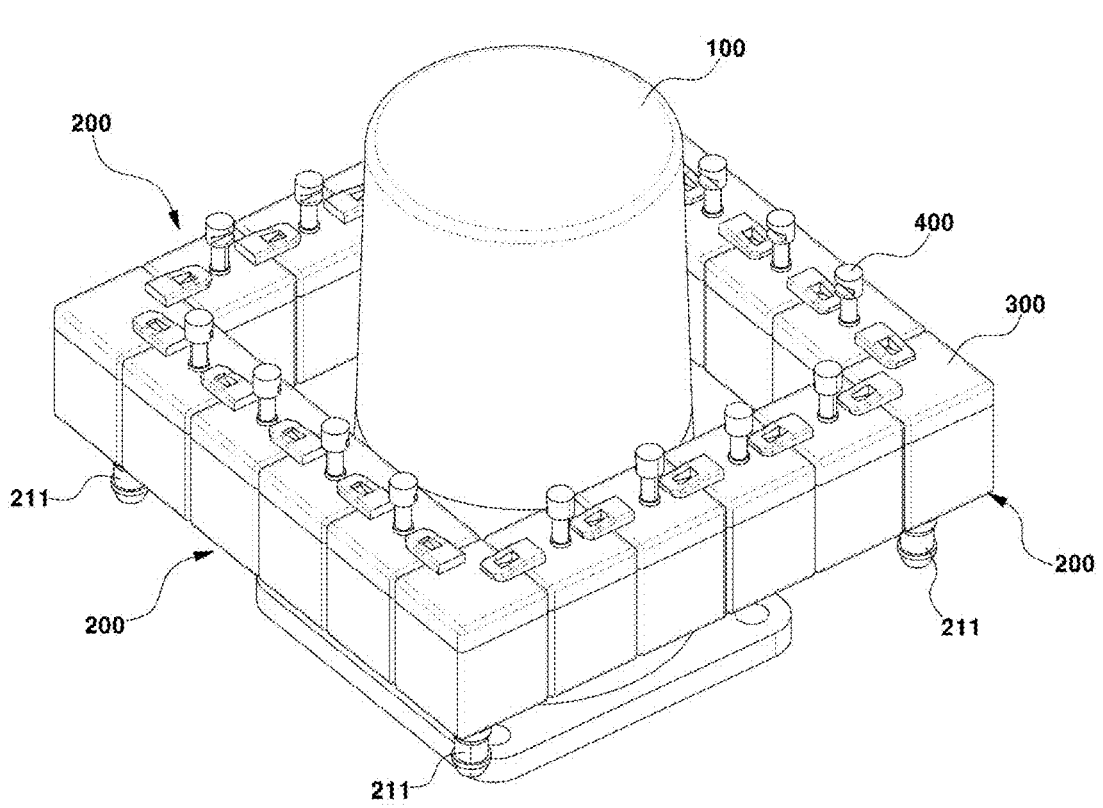
FIG. 1 is a view schematically showing a structure of an apparatus for cleaning a sensor according to an embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes should be determined in section by the particular intended application and use environment.

In the figures, reference numbers refer to the same or equivalent sections of the present disclosure throughout the several figures of the drawing.

DETAILED DESCRIPTION

Hereinafter, embodiments according to the present disclosure are described in detail with reference to the accompanying drawings.

Advantages and features of the present disclosure and a method of achieving the same should become apparent with reference to the embodiments described below in detail in conjunction with the accompanying drawings.

However, the present disclosure is not limited to embodiments disclosed below but will be implemented in various different forms, and only the embodiments are provided so that the disclosure of the present disclosure will be thorough and complete and will fully convey the scope of the present disclosure to those having ordinary skill in the art to which the present disclosure pertains, and the present disclosure is defined by the scope of the claims.

In addition, in the description of the present disclosure, when it is determined that related known techniques may obscure the gist of the present disclosure, a detailed description thereof is omitted.

When a component, device, element, or the like of the present disclosure is described as having a purpose or performing an operation, function, or the like, the component, device, or element should be considered herein as being "configured to" meet that purpose or to perform that operation or function.

Figure 2:
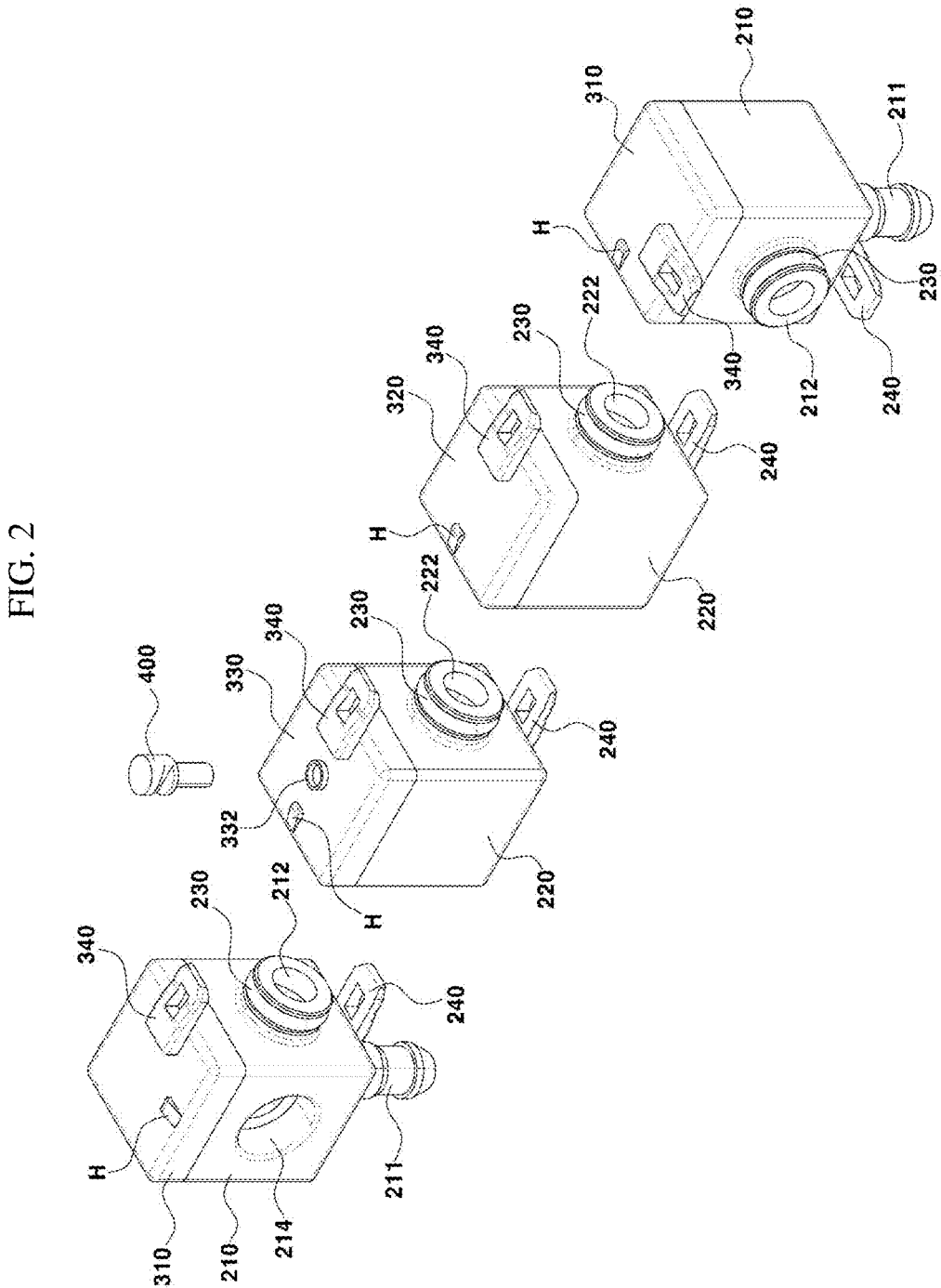
FIG. 2 is a view showing the arrangement of a first housing and a second housing of the apparatus for cleaning the sensor according to an embodiment of the present disclosure.
Figure 3:
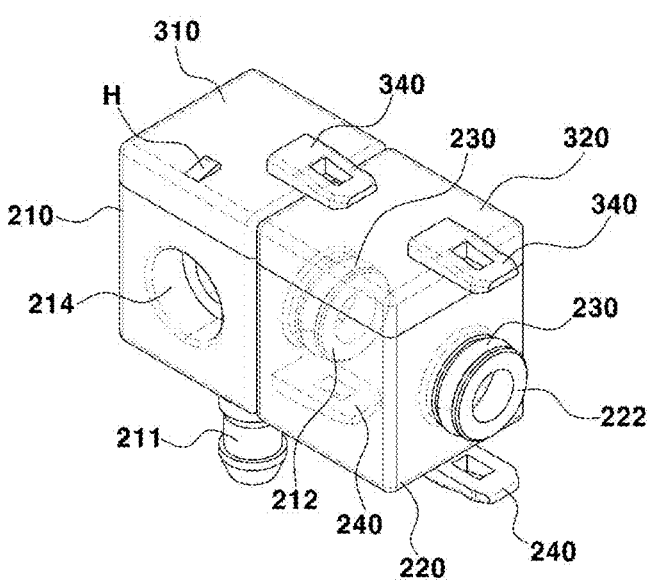
FIG. 3 is a view showing the coupling of the first housing and the second housing of the apparatus for cleaning the sensor according to an embodiment of the present disclosure.

FIG. 1 is a view schematically showing a structure of an apparatus for cleaning a sensor according to an embodiment of the present disclosure, FIG. 2 is a view showing the arrangement of a first housing and a second housing of the apparatus for cleaning the sensor according to the embodiment of the present disclosure, and FIG. 3 is a view showing the coupling of the first housing and the second housing of the apparatus for cleaning the sensor according to the embodiment of the present disclosure.

Figure 4:
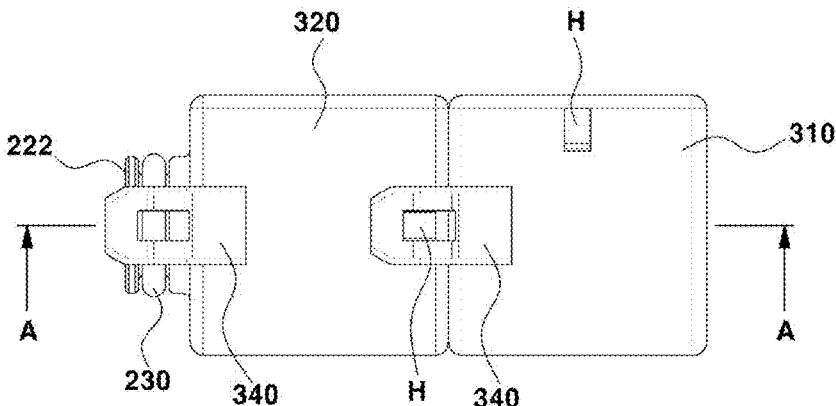
FIG. 4 is a view showing a coupled state of the first housing and the second housing of the apparatus for cleaning the sensor according to an embodiment of the present disclosure.
Figure 5:
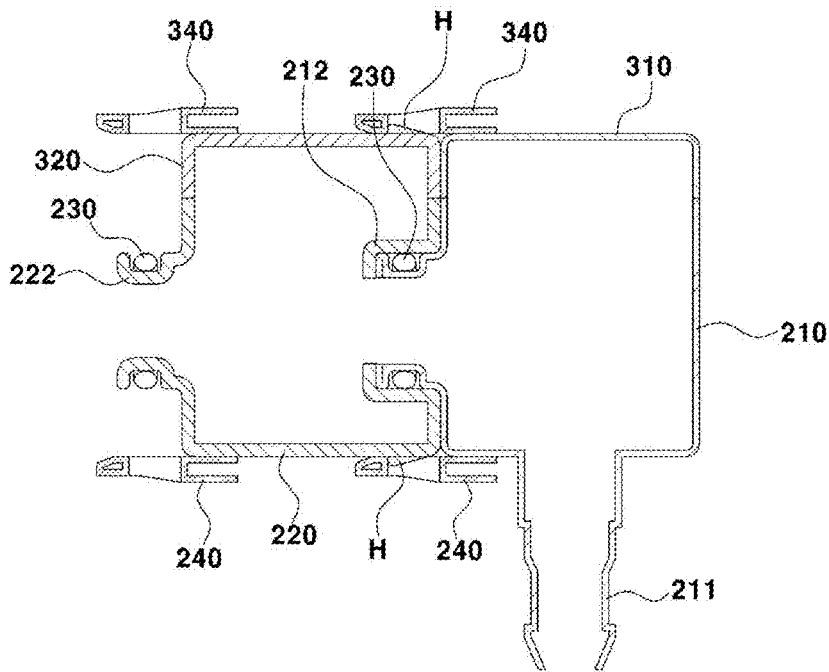
FIG. 5 is a cross-sectional view showing a region A-A in FIG. 4 of the apparatus for cleaning the sensor according to the embodiment of the present disclosure.
Figure 6:
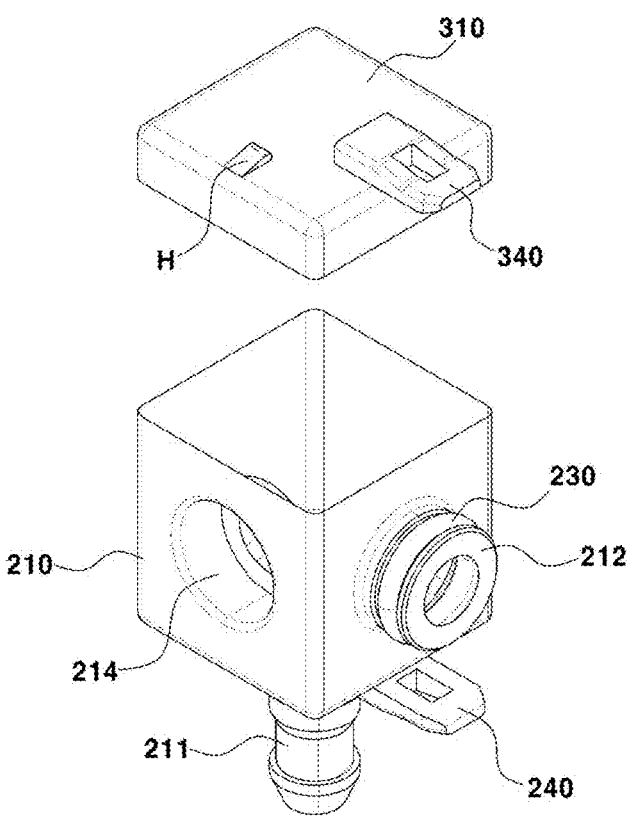
FIG. 6 is a view showing the mounting of the first housing and a first cover member of the apparatus for cleaning the sensor according to an embodiment of the present disclosure.

In addition, FIG. 4 is a view showing a coupled state of the first housing and the second housing of the apparatus for cleaning the sensor according to the embodiment of the present disclosure, FIG. 5 is a cross-sectional view showing a region A-A in FIG. 4 of the apparatus for cleaning the sensor according to the embodiment of the present disclosure, and FIG. 6 is a view showing the mounting of the first housing and a first cover member of the apparatus used for cleaning the sensor according to an embodiment of the present disclosure.

Figure 7A:
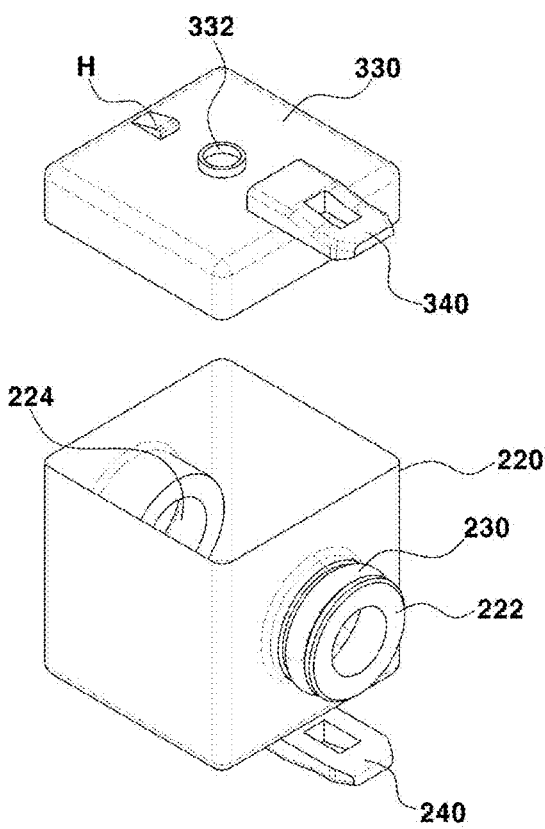
FIGS. 7A and 7B are views showing the mounting of the second housing and a second cover member or a third cover member of the apparatus for cleaning the sensor according to an embodiment of the present disclosure.
Figure 7B:
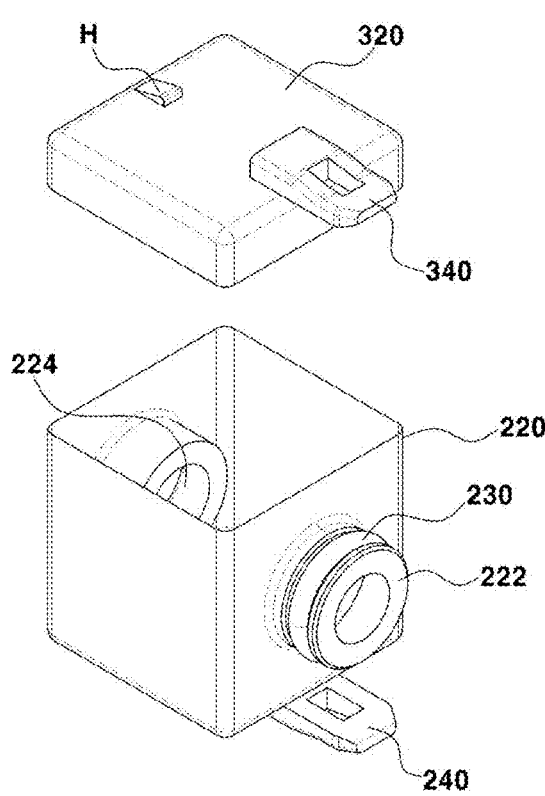
Figure 8:
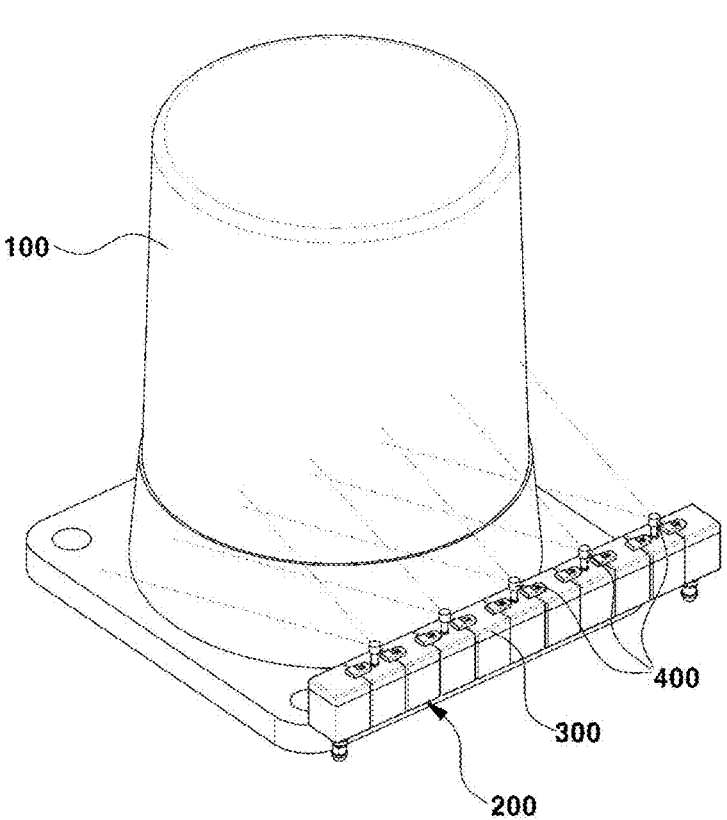
FIG. 8 is a view showing an arrangement of a washer fluid flow path of the apparatus for cleaning the sensor according to an embodiment of the present disclosure.
Figure 9:
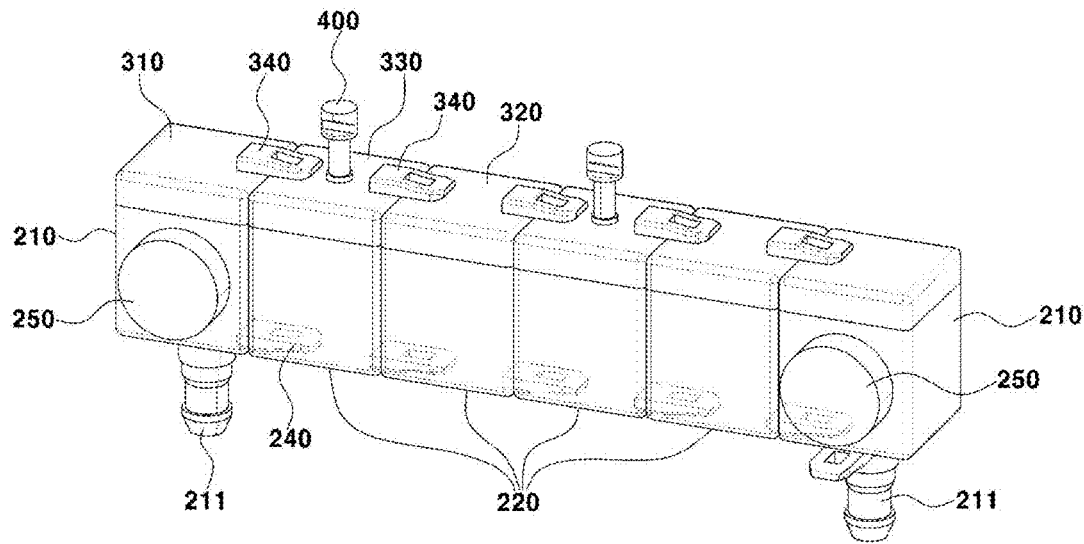
FIG. 9 is a view showing a finishing member of the apparatus for cleaning the sensor according to an embodiment of the present disclosure.

In addition, FIGS. 7A and 7B are views showing the mounting of the second housing and a second or third cover member of the apparatus for cleaning the sensor according to another embodiment of the present disclosure, FIG. 8 is a view showing an embodiment of the arrangement of a washer fluid flow path of the apparatus for cleaning the sensor according to the embodiment of the present disclosure, and FIG. 9 is a view showing a finishing member of the apparatus for cleaning the sensor according to an embodiment of the present disclosure.

As shown in FIG. 1, an apparatus for cleaning a sensor according to the embodiment includes a sensor unit 100, a washer fluid flow path unit 200, a cover unit 300, and a spray nozzle unit 400.

In general, a light detection and ranging (LiDAR) functions to determine a distance from a surrounding object and a shape of the surrounding object. It does so by emitting a laser light in a preset direction and detecting the surrounding object. The LiDAR sensor applied to a vehicle functions to generally scan and collect terrain and obstacle surface information corresponding to a distance region of interest around the vehicle while moving in real time.

The LiDAR has a similar principle to a radar, but there is a difference in that the radar emits electromagnetic waves to the outside and confirms a distance, a direction, and the like with re-received electromagnetic waves, whereas the LiDAR emits laser light. There is advantage in that the LiDAR may have higher precision and resolution and may also confirm a three-dimensional shape depending on objects because it uses laser light with a short wavelength.

However, when the sensor unit 100 is applied to a vehicle to detect an external object, the sensor unit 100 is exposed to the outside and is inevitably contaminated by foreign substances because it is generally mounted on a front bumper of the vehicle. This reduces the performance of the sensor, so it is desired to remove the foreign substances by spraying a washer fluid.

However, since the sensor unit 100 has a different size and field of view (FOV) region depending on vehicle models and installation positions, a nozzle may need to have different design based on the size and FOV region of the sensor unit 100 as well as the function to remove foreign substances from the sensor unit 100 well. As a result, a separate nozzle corresponding to the size and FOV region of the sensor unit 100 needs to be developed, and thus there occurs a problem in that this is not efficient in terms of the manufacturing cost or the like.

To this end, the washer fluid flow path unit 200 has a predetermined length and shape and is modularized, and at least one washer fluid flow path unit 200 is assembled and arranged to correspond to the size and FOV region of the sensor unit 100 so that a spray flow path for flowing a washer fluid supplied through an inlet nozzle 211 is formed.

In other words, as shown in FIG. 2, the washer fluid flow path unit 200 may include a first housing 210 and a second housing 220.

The first housing 210 includes the inlet nozzle 211 protruding downward, has an opened top box shape, and is provided with a connecting member 212 and an assembling hole 214 along an adjacent side surface in a vertical direction.

This first housing 210 may be disposed to correspond to a 360° FOV region of the sensor unit 100. More specifically, as shown in FIG. 1, the first housing 210 may be disposed at each of the four corners of the sensor unit 100 and formed to be connected to a reservoir (not shown) in which the washer fluid is stored by the inlet nozzle 211.

In addition, the first housing 210 may be disposed at each of two corners of the radar sensor unit 100 to correspond to a 180° FOV region of the radar sensor unit 100 (see FIG. 8), and as described above, the inlet nozzle 211 configured to supply the washer fluid and the reservoir (not shown) may be connected by setting the arrangement position of the first housing 210 to corresponding to the size and various FOV regions of the sensor unit 100.

Therefore, in the embodiment, the second housing 220 may be additionally assembled or disassembled to correspond to the size and 180° or 360° FOV region of the sensor unit 100 by assembling and modularizing the second housing 220 between the first housing 210 facing each other, thereby universally applying the apparatus for cleaning the sensor, and as a result, since a separate structure needs not to be mounted according to the size and FOV region of the sensor unit 100 by mounting the spray nozzle unit 400 in the modularized first housing 210 and second housing 220, it may be efficient in terms of the manufacturing cost or the like.

As shown in FIG. 9, the first housing 210 may include a finishing member 250 mounted in the connecting member 212 and the assembling hole 214 disposed at each of the corners of the radar sensor unit 100, and the finishing member 250 may finish the spray flow path when the first housing 210 is disposed at each of two corners of the radar sensor unit 100 to correspond to the 180° FOV region of the radar sensor unit 100 as described above.

In addition, the second housing 220 is formed in the same shape as that of the first housing 210 except for the inlet nozzle 211. As described above, one or more second housings 220 are arranged between the first housings which are selectively disposed at the corners of the radar sensor unit 100 and separated from each other to form the spray flow path for moving the washer fluid supplied from the reservoir (not shown) along its inner side.

The second housing 220 is provided with a connecting member 222 and an assembling hole 224 formed in the same manner as the connecting member 212 and the assembling hole 214 of the first housing 210. The connecting member 222 and the assembling hole 224 are provided on two opposing sides of the second housing 220 oriented in a direction of assembly so that it can be consecutively assembled between a pair of the first housings 210 facing each other at a length.

As shown in FIGS. 2 and 3, the first housing 210 and the second housing 220 may be assembled by a forcibly fitting method. In other words, the connecting member 212 of the first housing 210 is inserted into the assembling hole 224 of the second housing 220 so that the facing surfaces match each other, and thus the washer fluid supplied to the first housing 210 through the inlet nozzle 211 may be moved to the second housing 220 along the assembled connecting member 212.

In the same manner, a plurality of second housings 220 are also assembled in the forcibly fitting method, and since the second housing 220 has the connecting member 222 and the assembling hole 224 provided on one side and the other side, setting it apart from the first housing 210 (see FIG. 2), the second housing 220 may have a predetermined length to correspond to the size and FOV region of the radar sensor unit 100 by assembling each of the second housings 220 by the forcibly fitting method.

Here, the connecting members 212 and 222 are provided on the first housing 210 and the second housing 220, respectively, and may have an O-ring member 230 mounted on outer circumferential surfaces thereof. When the first housing 210 and the second housing 220 or plurality of second housings 220 are assembled, the O-ring member 230 may seal the spray flow path when the washer fluid moves along the first housing 210 and the second housing 220 through the connecting members 212 and 222.

In addition, the first housing 210 and the second housing 220 may include an auxiliary fastening member 240 formed to protrude from each lower portion in the same direction as that of the provided connecting members 212 and 222 (see FIGS. 2 and 3).

When the first housing 210 and the second housing 220 are assembled and the plurality of second housings 220 are assembled, the auxiliary fastening member 240 may assist the assembling by being positioned to be latched by a latching member H provided on the first housing 210 and second housing 220 adjacent to each other. By using this, it is possible to prevent a misalignment problem of facing surfaces when the connecting member 212 and the assembling hole 224 are assembled by the forcibly fitting method.

Meanwhile, the cover unit 300 is coupled to each of the first housing 210 and the second housing 220 to shield an opened upper surface of the washer fluid flow path unit 200.

To this end, as shown in FIGS. 6, 7A, and 7B, the cover unit 300 includes a first cover member 310, a second cover member 320, and a third cover member 330.

The first cover member 310 is formed to shield the opened upper surface of the first housing 210.

The first cover member 310 has a structure in which the latching member H protrudes in a direction in which the assembling hole 214 is provided.

In addition, the second cover member 320 is formed to shield an opened upper surface of the second housing 220.

In addition, as shown in FIG. 7A, the third cover member 330 is formed to shield the opened upper surface of the second housing 220 and includes a mounting hole 332 for mounting the spray nozzle unit 400.

Here, the third cover member 330 has a structure in which the latching member H is formed to protrude in a direction in which the assembling hole 224 is provided. The structure has the same size and shape as those of the second cover member 320 but may be distinguished from the second cover member 320 by whether the mounting hole 332 is present or not.

Specifically, the third cover member 330 is mounted alternately with the second cover member 320 or consecutively mounted selectively on upper surfaces of the plurality of second housings 220.

More specifically, as shown in FIGS. 8 and 9, as for the second housings 220 arranged at a predetermined length by the forcibly fitting method between the connecting member 212 and the assembling hole 214, the second cover member 320 and the third cover member 330 may be alternately mounted and a plurality of spray nozzle units 400 may also be alternately mounted through the mounting hole 332. However, the spray nozzle unit 400 mounted in each mounting hole 332 may be consecutively disposed by consecutively mounting only the third cover member 330.

Therefore, it is possible to adjust the spray range of the washer fluid through the spray nozzle unit 400 by consecutively disposing the spray nozzle unit 400 as described above.

In other words, a vehicle typically driven in a cold region has the washer fluid stored in the reservoir (not shown) with a relatively high viscosity, and thus when the vehicle sprays the washer fluid for cleaning, the spray range is inevitably decreased by the viscosity.

In this case, as for the washer fluid flow path unit 200 formed by modularizing the first housing 210 and the second housing 220, by consecutively mounting only the third cover member 330 on the upper surface of the second housing 220 and mounting the spray nozzle unit 400 in the mounting hole 332, it is possible to expand the spray range by consecutively disposing the spray nozzle unit 400.

As described above, when the first cover member 310 to the third cover member 330 are coupled to the first housing 210 and the second housing 220, there may be provided an auxiliary fastening member 340 formed to protrude in the same direction as those of the connecting members 212 and 222 provided on the first housing 210 and the second housing 220 (see FIGS. 6, 7A, and 7B).

When the first housing 210 and the second housing 220 are assembled and the plurality of second housings 220 are assembled, the auxiliary fastening member 340 may assist the assembling by being positioned to be latched by the latching member H provided on the first housing 210 and second housing 220 adjacent to each other, thereby preventing a misalignment problem of the facing surfaces when the connecting member 212 and the assembling hole 224 are assembled by the forcibly fitting method together with the auxiliary fastening member 240 described above.

Here, although it has been described that the cover unit 300 including the first cover member 310 to the third cover member 330 is coupled as described above, this is only one embodiment and not determined, and in modularizing the first housing 210 and the second housing 220, all including the spray nozzle unit 400 may be modularized together by integrally coupling the cover unit 300 to the upper surfaces of the first housing 210 and the second housing 220.

Meanwhile, the spray nozzle unit 400 is selectively coupled to the mounting hole 332 of the third cover member 330 and formed so that the washer fluid flowing along the spray flow path is sprayed toward the FOV region of the sensor unit 100.

The plurality of spray nozzle units 400 with different spray angles may be provided, and when coupled to the mounting holes 332, the plurality of spray nozzle units 400 with different spray angles as described above may be alternately mounted in the mounting holes 332.

This is to effectively clean the FOV region of the sensor unit 100, and since it is typically difficult to accurately identify the position contaminated by foreign substances, it is possible to more effectively clean the foreign substances by alternately performing the washer fluid spray of the spray nozzle unit 400 to a relatively higher position and lower position of the radar sensor unit 100 (see FIG. 8).

According to the present disclosure, it is possible to make the cleaning of the LiDAR sensor universal by applying different washer fluid spray structures according to the size and the field of view (FOV) region of 180° or 360° of the LiDAR sensor by modularizing a plurality of washer fluid flow paths including a nozzle and selectively assembling or disassembling one or more modularized washer fluid flow paths to correspond the size or FOV region of the LiDAR sensor and change a length and shape of the washer fluid flow path.

In addition, it is possible to selectively adjust the spray range of the washer fluid by including the plurality of covers configured to shield the upper surface of the washer fluid flow path and alternately coupling or consecutively mounting the covers provided with the mounting holes for mounting the spray nozzle among the plurality of covers.

According to the present disclosure, it is possible to extensively adjust the spray range of the washer fluid with a relatively high viscosity to make it easy to clean the LiDAR sensor by consecutively mounting the covers provided with the mounting hole on the washer fluid flow path for the vehicle traveling the cold region.

Although the present disclosure has been described above with reference to the embodiment(s) shown in the drawings, this is only illustrative, and it should be understood by those having ordinary skill in the art that various modifications may be made therefrom and all or part of the above-described embodiment(s) may also be configured by being selectively combined. Therefore, the true technical scope of the present disclosure should be determined by the technical spirit of the present disclosure.

What is claimed is:

1. An apparatus for cleaning a sensor comprising:
a fluid flow path unit assembled and arranged to correspond to a size and a field of view (FOV) region of a sensor unit and formed with a spray flow path for spraying a fluid supplied through an inlet nozzle;
a cover unit coupled to the fluid flow path unit to shield an opened upper surface of the fluid flow path unit; and
at least one spray nozzle unit selectively coupled to the cover unit and formed so that the fluid flowing along the spray flow path is sprayed toward the FOV region, wherein the fluid flow path unit includes:
a plurality of first housings, each formed in an opened top box shape and including the inlet nozzle, wherein each first housing further includes a first connecting member and a first assembling hole respectively disposed on side surfaces thereof; and at least one second housing having a shape corresponding to the shape of the plurality of first housings and configured to be arranged between separately disposed first housings of the plurality of first housings to form the spray flow path,
wherein the fluid flow path unit is configured to allow selective disassembly of the first housings and the at least one second housing arranged between the first housings,
wherein the at least one second housing includes a plurality of second housings, and the cover unit includes:
a first cover member configured to shield an opened upper surface of a corresponding one of the plurality of first housings;
a second cover member configured to shield an opened upper surface of one second housing of the plurality of second housings; and
a third cover member configured to shield an opened upper surface of another second housing of the plurality of second housings and including a mounting hole for mounting the at least one spray nozzle unit, and
wherein the third cover member is mounted alternately with the second cover member or consecutively mounted selectively on the upper surfaces of the plurality of second housings.

2. The apparatus of claim 1, wherein the first housings correspond to the FOV region and are connected to a reservoir in which the fluid is stored, and the fluid flow path unit is configured to correspond to a 360° FOV region of the sensor unit through assembly of the at least one second housing with the first housings.

3. The apparatus of claim 1, wherein the at least one second housing includes a second connecting member and a second assembling hole respectively disposed on side surfaces thereof, and
wherein the first connecting member of one of the separately disposed first housings, is configured to be inserted into the second assembling hole and the second connecting member is configured to be inserted into the first assembling hole of another of the separately disposed first housings, such that the fluid flow path unit corresponds in length to the size and FOV region of the sensor unit.

4. The apparatus of claim 3, wherein the fluid flow path unit includes an O-ring member mounted on each of the first connecting member and the second connecting member and configured to seal the spray flow path when the first housings and the at least one second housing are assembled.

5. The apparatus of claim 3, wherein the fluid flow path unit includes an auxiliary fastening member formed to protrude in a same direction as a direction of the first connecting member and the second connecting member and configured to assist in assembly of the fluid flow path unit by being positioned to be latched when the first housings and the at least one second housing are assembled.

6. The apparatus of claim 1, wherein the fluid flow path unit includes a cover member mounted in at least one of the first connecting member or the first assembling hole and formed to shield an inside of the plurality of first housings exposed to an outside.

7. The apparatus of claim 3, wherein the cover unit includes an auxiliary fastening member formed to protrude in a same direction as a direction of the first connecting member and the second connecting member and configured to assist in assembly of the fluid flow path unit by being positioned to be latched when the first housings and the at least one second housing are assembled.

8. The apparatus of claim 1, wherein the at least one spray nozzle unit includes a plurality of spray nozzle units with different spray angles.

9. The apparatus of claim 8, wherein the plurality of spray nozzle units are alternately coupled to the cover unit.

10. An apparatus for cleaning a sensor comprising:

a fluid flow path unit assembled and arranged to correspond to a size and a field of view (FOV) region of a sensor unit, formed with a spray flow path for flowing a fluid supplied through an inlet nozzle, and including a cover unit coupled integrally to shield an opened upper surface of the fluid flow path unit; and at least one spray nozzle unit coupled to the cover unit and formed so that the fluid flowing along the spray flow path is sprayed toward the FOV region of the sensor unit, wherein the fluid flow path unit includes:

a plurality of first housings, each formed in an opened top box shape and including the inlet nozzle, wherein each first housing further includes a first connecting member and a first assembling hole respectively disposed on side surfaces thereof; and at least one second housing having a shape corresponding to the shape of the plurality of first housings and configured to be arranged between the plurality of first housings to form the spray flow path, wherein the fluid flow path unit is configured to allow selective disassembly of the plurality of first housings and the at least one second housing, wherein the at least one second housing includes a plurality of second housings, and the cover unit includes:

a first cover member configured to shield an opened upper surface of a corresponding one of the plurality of first housings;

a second cover member configured to shield an opened upper surface of one second housing of the plurality of second housings; and a third cover member configured to shield an opened upper surface of another second housing of the plurality of second housings and including a mounting hole for mounting the at least one spray nozzle unit, and wherein the third cover member is mounted alternately with the second cover member or consecutively mounted selectively on the upper surfaces of the plurality of second housings.

11. The apparatus of claim 10, wherein the at least one spray nozzle unit includes a plurality of spray nozzle units with different spray angles.

12. The apparatus of claim 11, wherein the plurality of spray nozzle units are alternately coupled to the cover unit.

13. An apparatus for cleaning a sensor comprising:

a fluid flow path unit assembled and arranged to correspond to a size and a field of view (FOV) region of a sensor unit and formed with a spray flow path for spraying a fluid supplied through an inlet nozzle;

a cover unit coupled to the fluid flow path unit to shield an opened upper surface of the fluid flow path unit; and at least one spray nozzle unit selectively coupled to the cover unit and formed so that the fluid flowing along the spray flow path is sprayed toward the FOV region, wherein the fluid flow path unit includes:

a plurality of first housings, each formed in an opened top box shape and including the inlet nozzle, wherein each first housing further includes a first connecting member and a first assembling hole respectively disposed on side surfaces thereof; and at least one second housing having a shape corresponding to the shape of the plurality of first housings and configured to be arranged between the plurality of first housings to form the spray flow path, wherein the at least one second housing includes a plurality of second housings, and the cover unit includes a first cover member configured to shield an opened upper surface of a corresponding one of the plurality of first housings;

a second cover member configured to shield an opened upper surface of one second housing of the plurality of second housings; and a third cover member configured to shield an opened upper surface of another second housing of the plurality of second housings and including a mounting hole for mounting the at least one spray nozzle unit, and wherein the third cover member is mounted alternately with the second cover member or consecutively mounted selectively on the upper surfaces of the plurality of second housings.

\* \* \* \* \*